United States Patent [19]
Easton

[11] Patent Number: 6,000,490
[45] Date of Patent: Dec. 14, 1999

[54] STEERING INPUT DEVICE

[75] Inventor: David Joseph Easton, Cedar Falls, Iowa

[73] Assignee: Deere & Company, Moline, Ill.

[21] Appl. No.: 08/991,961

[22] Filed: Dec. 17, 1997

[51] Int. Cl.[6] .................................................. D62D 5/00
[52] U.S. Cl. .............................. 180/402; 180/446; 280/88
[58] Field of Search ................................... 180/402, 443, 180/422, 446; 188/164; 280/88, 89

[56] References Cited

U.S. PATENT DOCUMENTS

| | | | |
|---|---|---|---|
| 3,011,579 | 12/1961 | Milliken, Jr. et al. . | |
| 3,704,766 | 12/1972 | Jaeschke | 188/164 |
| 4,558,759 | 12/1985 | Baatrup et al. | 180/422 |
| 4,635,741 | 1/1987 | Morishita et al. | 180/422 |
| 4,700,794 | 10/1987 | Bernhagen et al. . | |
| 4,771,846 | 9/1988 | Venable et al. | 180/422 |
| 4,914,592 | 4/1990 | Callahan et al. . | |
| 4,955,442 | 9/1990 | Crabb et al. . | |
| 5,390,751 | 2/1995 | Puetz et al. . | |
| 5,517,096 | 5/1996 | Shtarkman et al. | 180/422 |

*Primary Examiner*—Kevin Hurley
*Assistant Examiner*—Lynda Jasmin

[57] ABSTRACT

A vehicle steering input device includes a fixed housing, a steering input shaft rotatable relative to the housing by a vehicle operator, a hub non-rotatably mounted on the input shaft, a friction member frictionally engaging the hub, a resilient member biased to maintain the friction member in engagement with the hub member, a movable locking ring meshingly coupled to the friction member, and an electromagnet. When the electromagnet is energized it moves the locking ring into meshing engagement with the housing, thus limiting rotation of the friction member and creating an additional friction force which makes it more difficult to rotate the hub and the input shaft. The magnitude of this friction force depends on the bias of the resilient member and is not limited by the strength of the electromagnet.

12 Claims, 5 Drawing Sheets

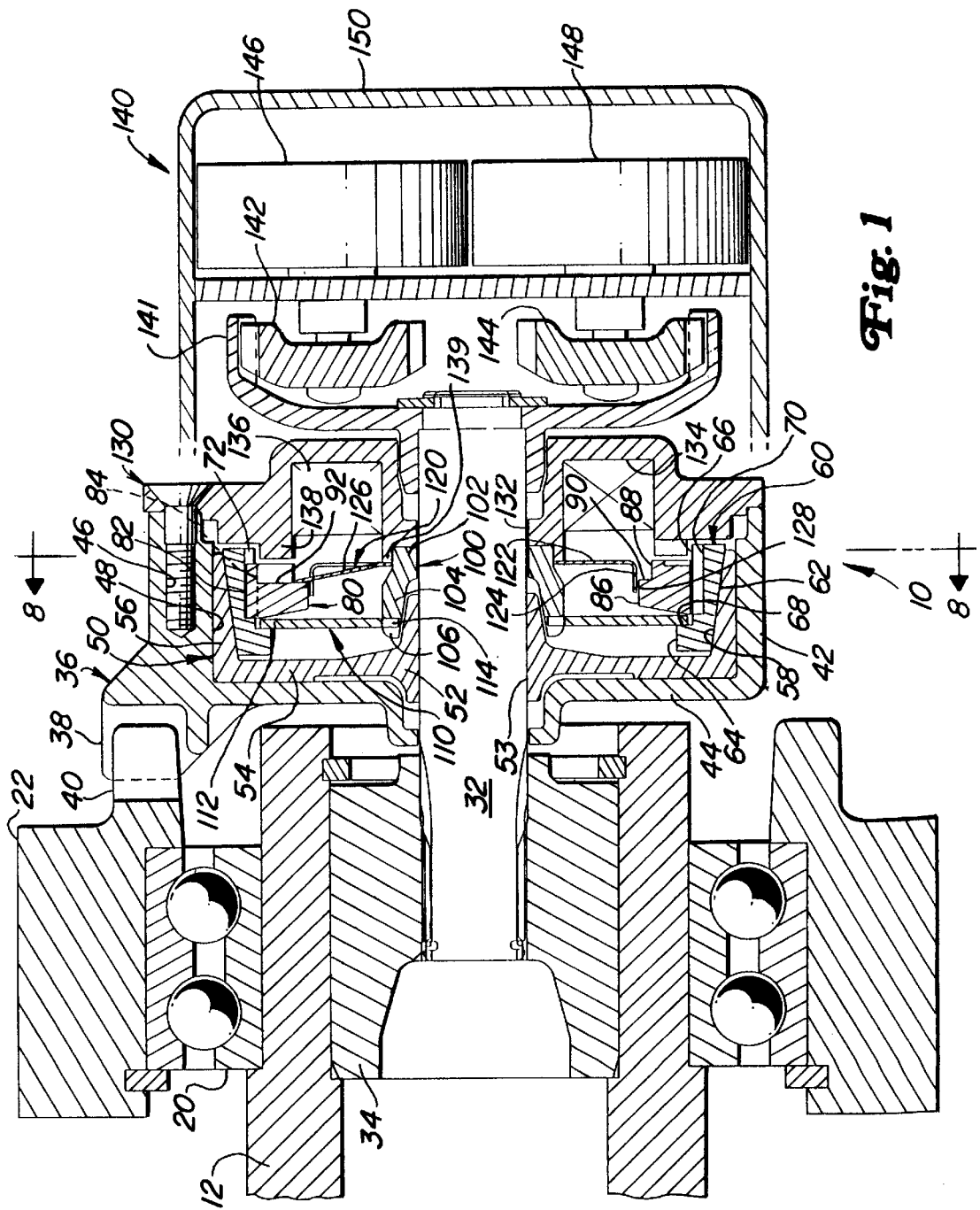

_6,000,490_

STEERING INPUT DEVICE

BACKGROUND OF THE INVENTION

The invention relates to a steering input device with controllable feel.

U.S. Pat. No. 4,771,846 shows a steering apparatus which creates a steering feel in a steering system for controlling a vehicle with steerable wheels. The feel is provided by an electromagnetic friction brake which is controlled by an electronic control unit in response to a steering wheel position sensor and a steered wheel position sensor. The amount of friction force depends upon and is limited by the strength of the electromagnet. Rotation of the steering wheel shaft is mechanically limited to 1 ½ turns in either direction from a center position by a gear mechanism which includes a pair of end stops. Furthermore, in the '846 design the steering wheel position sensor is a linear potentiometer type sensor which limits the range of positions of the steering wheel shaft which can be sensed.

U.S. Pat. No. 3,011,579 shows a steering apparatus which creates a steering feel in a steering system for controlling a vehicle with steerable wheels. The '579 system has a feel servo system which includes a hydraulic motor drivably connected to a steering input shaft through a gear arrangement.

It would desirable to provide a steering input device wherein the feel is not directly limited by the capabilities of an electromagnet and wherein the feel mechanism does not require a hydraulic motor and gear arrangement.

SUMMARY OF THE INVENTION

Accordingly, an object of this invention is to provide a steering input device wherein the feel is not directly limited by the capabilities of an electromagnet.

Another object of this invention is to provide a steering input device wherein the feel mechanism does not require a hydraulic motor and gear arrangement.

Another object of this invention is to provide a steering input device wherein the rotation of the steering shaft is not limited.

Another object of this invention is to provide a steering input device wherein there is no limit to the range of steering shaft positions which can be sensed.

These and other objects are achieved by the present invention, wherein a vehicle steering input device includes a fixed housing, a steering input shaft rotatable relative to the housing by a vehicle operator, a hub member non-rotatably mounted on the input shaft, a friction member frictionally engaging the hub, a resilient member biased to maintain the friction member in engagement with the hub member, a movable locking ring meshingly coupled to the friction member, and an electromagnet. When the electromagnet is energized it moves the locking ring into meshing engagement with the housing, thus limiting rotation of the friction member. The frictional engagement of the friction member with the rotating hub produces a friction force which makes it more difficult to rotate the hub and the input shaft. The magnitude of this friction force depends on the bias of the resilient member and is not limited by the strength of the electromagnet.

BRIEF DESCRIPTION OF THE DRAWINGS

FIG. 1 is a sectional view of a steering input device according to the present invention.

DETAILED DESCRIPTION

Figure 3:
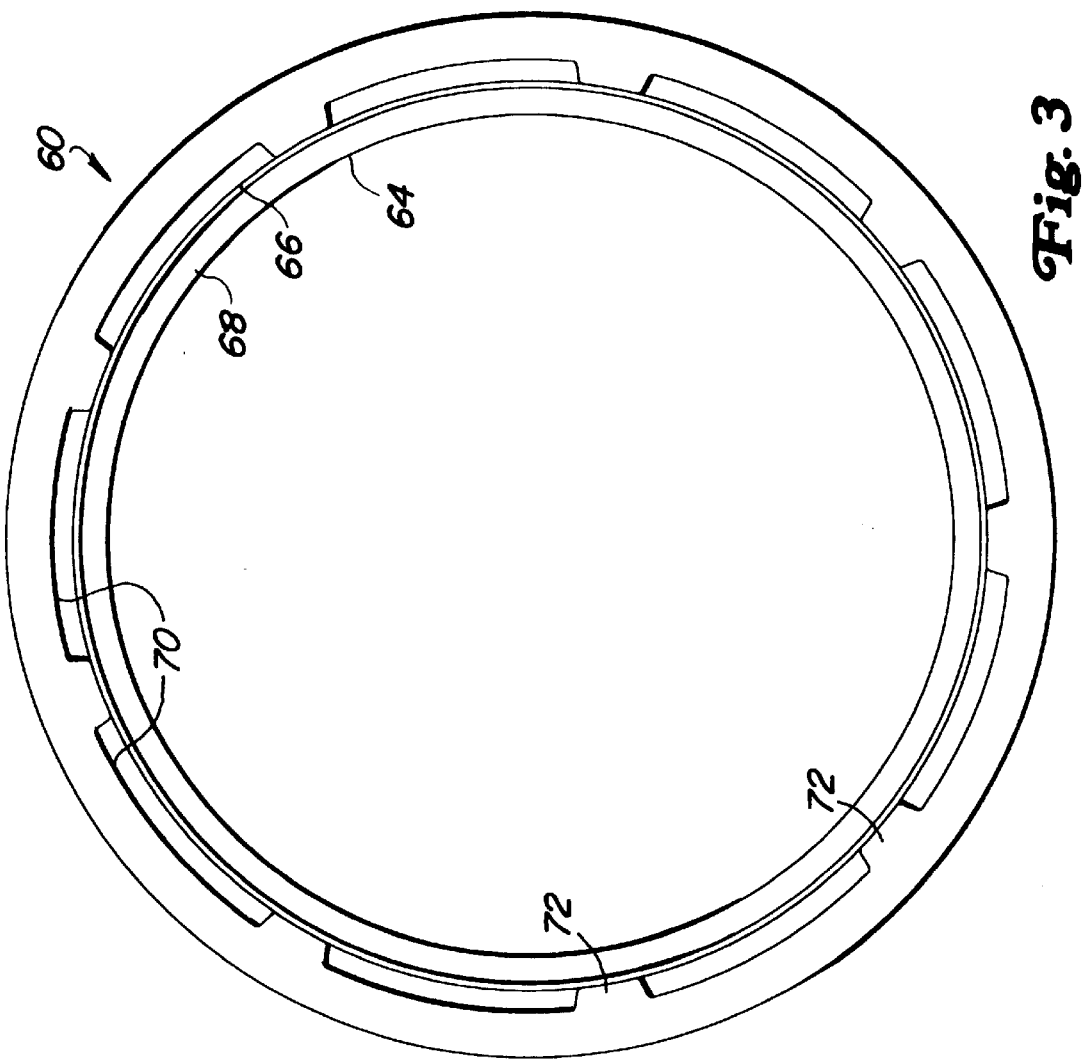
FIGS. 2 and 3 are sectional and end views, respectively, of the cone member of the present invention.

Referring to FIG. 1, a steering input device 10 includes a known conventional steering input shaft 12 which is coupled to a conventional steering wheel (not shown) and which is rotatably supported by bearings 20 within a steering column support housing 22 which is fixed to a vehicle frame (not shown). The steering input device 10 includes a shaft 32 which is splined to a shaft housing end portion 34 of the steering input shaft 12, the end portion being press-fitted into the steering input shaft 12. A non-magnetic housing 36 is mounted on the shaft 32 and includes a tab 38 which is received by a slot 40 formed in the housing 22 so that the housing 36 is prevented from rotating. The housing 36 includes a generally cylindrical outer rim 42 which extends axially from an outer portion of an annular disk 44. A plurality of spaced apart blind attachment bores 46 extend axially into the rim 42. Thus, the housing 36 forms a recess 48 which opens in a direction away from the steering input shaft 12 and through which extends the shaft 32.

A hub member 50 is rotatably and slidably received within the recess 48. The hub member 50 includes a hollow cylindrical hub 52 through which extends bore 53 which fixedly receives the shaft 32, an annular disk 54 which extends radially outwardly from the hub 52 and a hollow cylindrical rim 56 which extends axially away from an outer portion of the disk 54. The thickness of the rim 56 tapers from a thicker portion adjacent the disk 54 to a thinner end portion so that the inner surface 58 of the rim 56 is a frustoconical surface. The radially outer surface of the rim 56 and the outer surface of the disk 54 may include grooves to assure that lubricating oil is properly dispersed.

Figure 2:
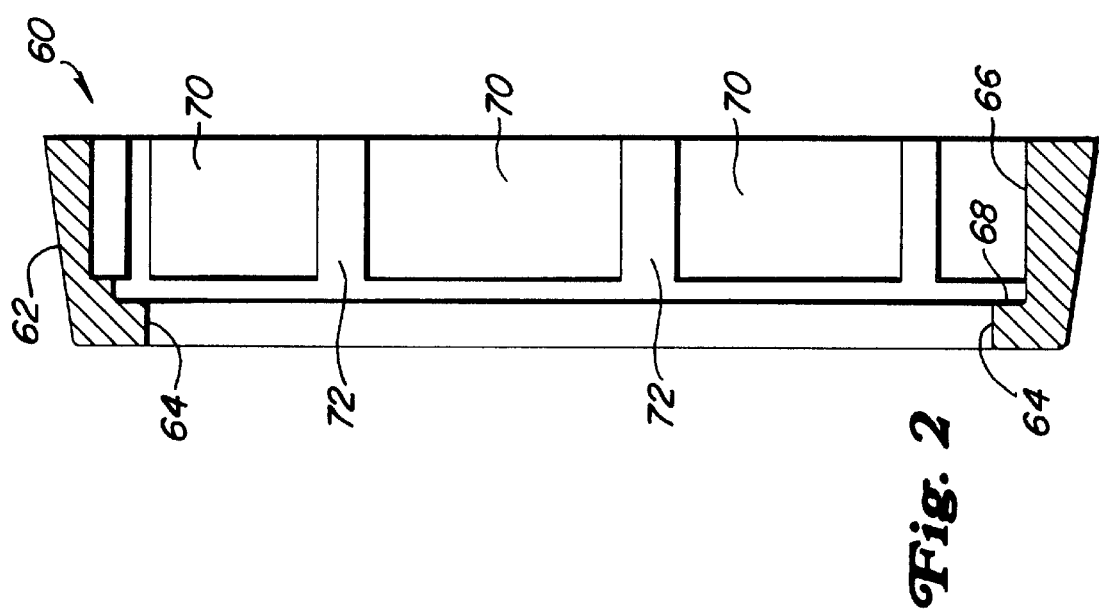

Referring now to FIGS. 1, 2 and 3, a hollow non-magnetic cone or friction member 60 is received within the hub member 50 and within the recess 48. The cone member 60 has a frustoconical outer surface 62 which mates with and engages the inner surface 58 of the hub member 50 and which tapers to a small diameter end in the direction towards the input shaft 12. The inner surface of the cone member 60 forms a smaller diameter cylindrical surface 64 joined to a larger diameter cylindrical surface 66 by an annular wall 68 which faces away from the input shaft 12. A plurality of recesses 70 are formed in the surface 66 so as to define a plurality of tabs 72 which extend axially away from the wall 68 and which project radially inwardly.

Figure 5:
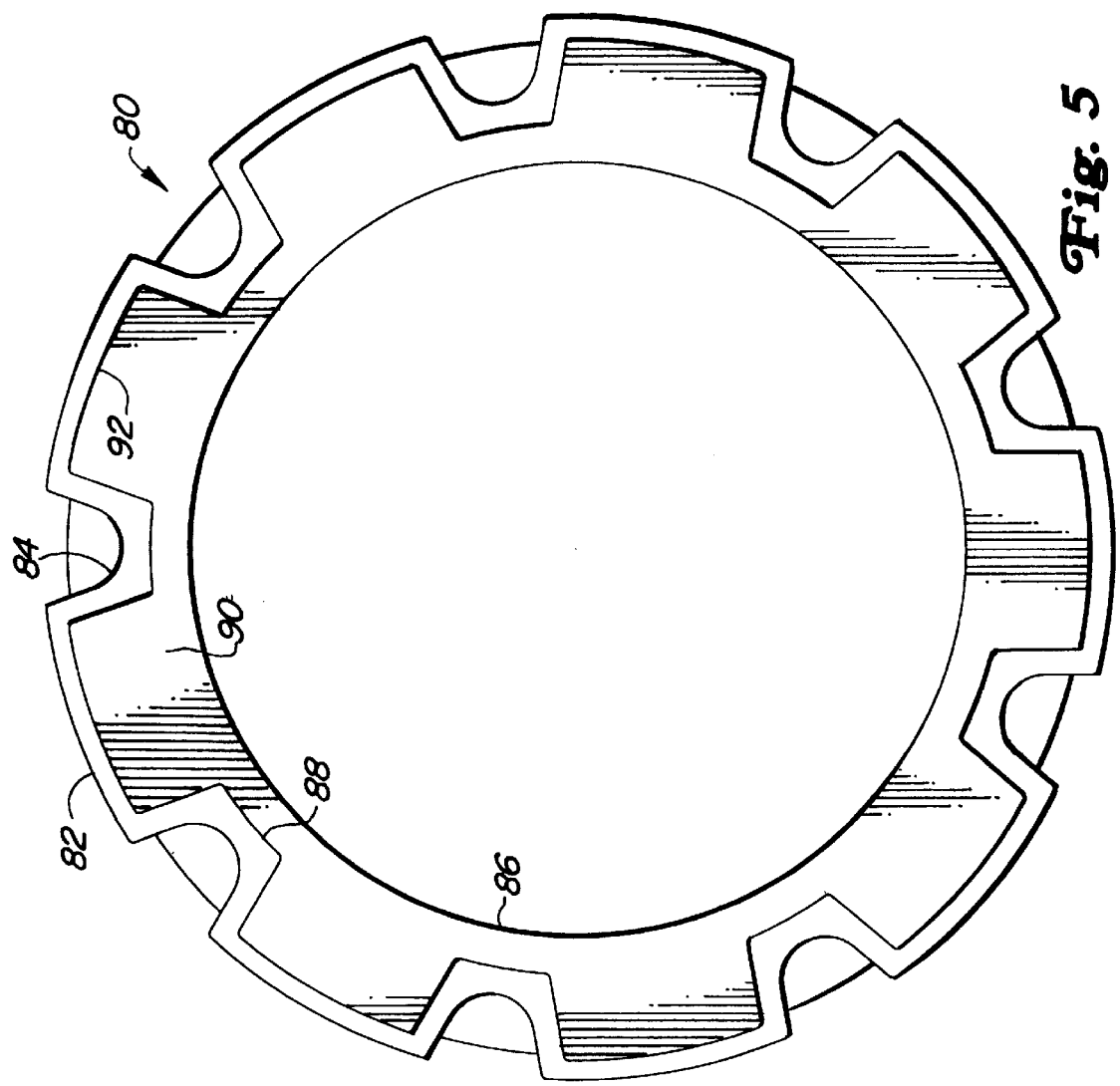
FIGS. 4 and 5 are sectional and end views, respectively, of the locking ring of the present invention.
Figure 4:
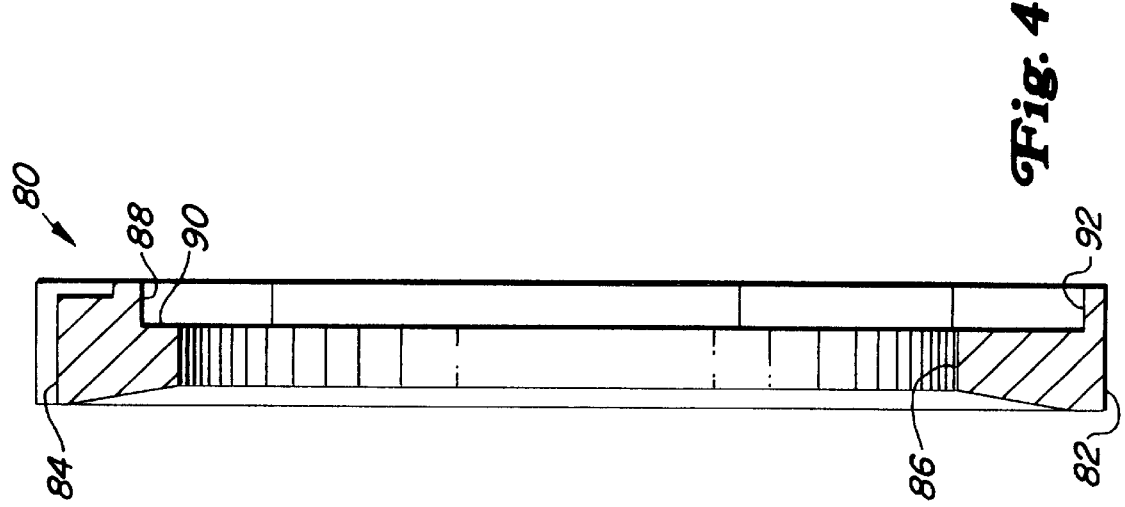

Referring now to FIGS. 1, 4 and 5, a hollow ferromagnetic locking ring or coupling member 80 is also received by the cone member 60 and within the recess 48. Locking ring 80 has a cylindrical outer surface 82 in which is formed a plurality of axially extending slots 84 which meshingly receive the tabs 72 of the cone member 60 so that the locking ring 80 is meshingly and slidably coupled to the cone member 60. The inner surface of the locking ring 80 forms a smaller diameter cylindrical surface 86 joined to a larger diameter cylindrical surface 88 by an annular wall 90 which faces away from the input shaft 12. A plurality of recesses 92 are formed in the surface 88, which recesses open radially inwardly and axially away from the steering input shaft 12.

A generally cylindrical thrust bearing 100 is rotatably mounted on the shaft 32. Thrust bearing 100 includes a smaller diameter base portion 102 and a larger diameter portion 104 which faces away from the base 102 and towards the hub so that portion 104 partially surrounds the hub 52 of hub member 50. A plurality, for example, four, projections 106 project substantially axially towards the hub member 50 from the end of portion 104.

Figure 6:
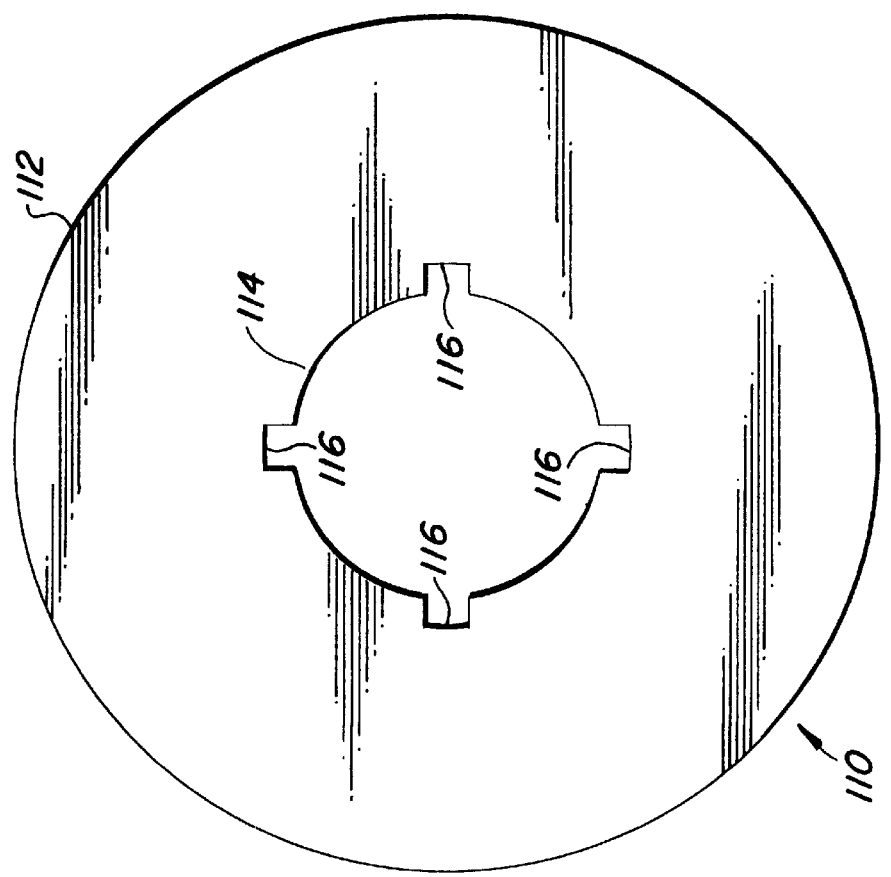
FIG. 6 is an end view of the Belleville spring of the present invention.

Referring now to FIGS. 1 and 6, an annular Belleville spring 110 is mounted in the recess 48 with its outer end 112 engaging the wall 68 of cone member 60 and with its inner end 114 engaging portion 104 of thrust bearing 100. The inner end 114 includes four slots 116 which receive the projections 106. Belleville spring 110 is concave in the direction towards the hub member 50. Belleville spring 110 thus comprises a resilient member which is biased to maintain the cone member 60 in engagement with the hub member 50.

Figure 7:
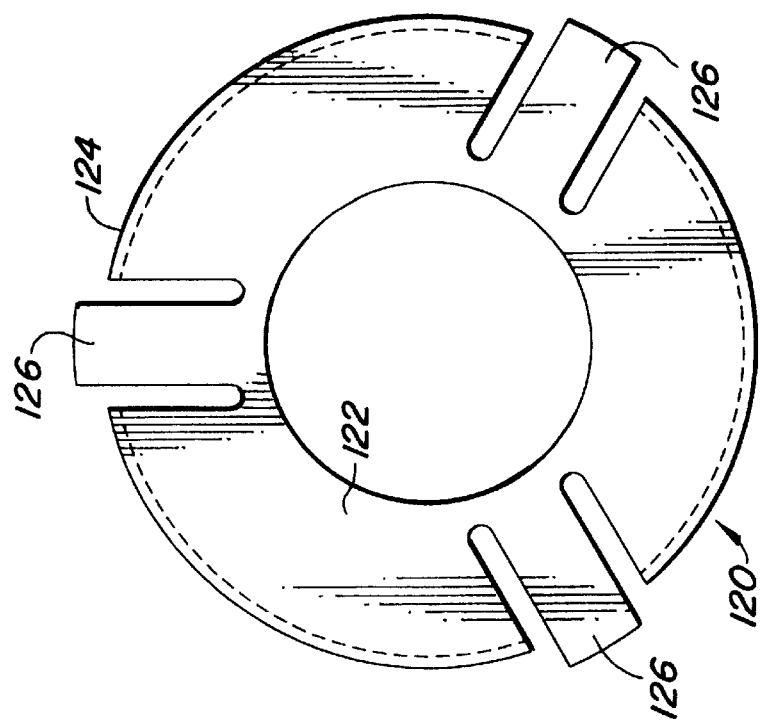
FIG. 7 is an end view of the return spring of the present invention.

Referring now to FIGS. 1 and 7, a ferro-magnetic return spring 120 is also mounted in the recess 48. The return spring 120 has a hollow annular disk 122 which rotatably receives the thrust bearing 100 and a cylindrical rim 124 which extends axially from the outer end of the disk 122. At a plurality, preferably three, spaced apart locations, material is removed from the return spring 120 to form three fingers 126. The fingers 126 project radially outwardly and are inclined in a direction towards the hub member 50. The outer ends of the fingers 126 slidably engage the annular wall 90 of the locking ring 80. The rim 124 includes an end portion 128 which extends beyond the fingers 126 and is rotatably and slidably received within the small diameter surface 86 of locking ring 80.

Figure 8:
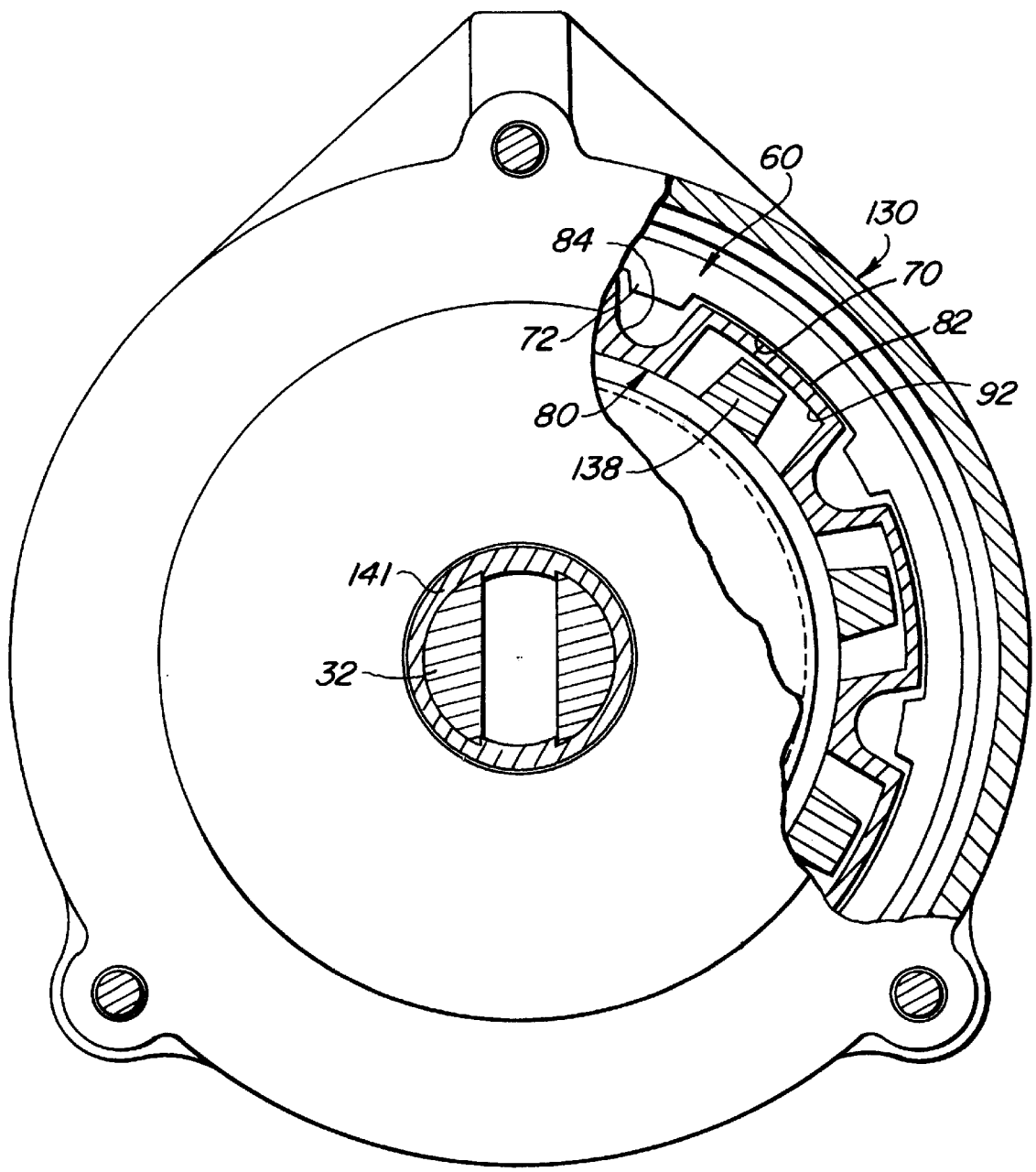
FIG. 8 is a view in the direction of arrows 8—8 of FIG. 1, with portions removed for clarity.

A ferro-magnetic cover 130 is attached to the housing 36, for example by screws threaded into bores 46. A central bore 132 extends through the cover 130 and rotatably receives the shaft 32. The cover 130 forms an annular recess 134 which opens towards the hub member 50 and in which is mounted an electromagnet coil 136. The cover also forms a plurality of projections 138 which extend radially and which project axially towards the hub member 50 and which are spaced apart in an annular array around the outer edge of the recess 134. As best seen in FIG. 8, the projections 138 meshingly engage with the recesses 92 of the locking ring 80 to limit rotation of the locking ring 80 with respect to the cover 130. Finally, the cover 130 also forms an annular lip 139 which projects axially towards the hub member 50, which receives a portion of the thrust bearing 100 and engages an inner portion of the return spring 120.

A transducer unit 140 generates signals representing the changes in position of the steering wheel (not shown) for communication to an electronic controller (not shown). The transducer unit 140 includes a ring gear 141 which is mounted on the end of shaft 32. Ring gear 141 drives a pair of gears 142,144, each of which drives a corresponding rotary incremental encoder 146, 148, such as a commercially available OakGrigsby 900 Optical Encoder or a Grayhill Series 61H encoder. The gears 141–144 and the encoders 146 and 148 are protected by a cover 150.

MODE OF OPERATION

In operation the hub member 50 always turns with the shaft 32. When the coil 136 is not energized the cone member 60 and the locking ring 80 also turn with the shaft 32 because the locking ring 80 is disengaged from the projections 138 of the housing 130.

When the coil 136 is energized the locking ring 80 is pulled towards the coil 136 so that the projections 138 of the housing 130 are received by the recesses 92 of the locking ring 80, thus limiting rotation of the locking ring 80. Because of the meshing engagement between the slots 84 of the locking ring 80 with the tabs 72 of the cone member 60, the rotation of the cone member 60 is also limited. Because the outer surface 62 of the cone member 60 frictionally engages the inner surface 58 of the hub member 50, this substantially increases the force or effort required to rotate the shaft 32 and the steering input shaft 12. The magnitude of this friction force depends on the bias of the Belleville spring 120, and is not limited by the strength of the electromagnet 136. The locking ring 80 is allowed to freely rotate a few degrees relative to the cone member 60 to permit easier disengagement when the coil 136 is de-energized. It should be noted that the shaft 32 is not spring centered and can be rotated an unlimited amount in either direction, even when its rotation is hindered by the larger friction force which results from energization of the coil 136 and engagement of the locking ring 80 with the projections 138.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A vehicle steering input device, comprising:
   a fixed housing;
   a steering input shaft rotatable relative to the housing by a vehicle operator;
   a hub member non-rotatably mounted on the steering input shaft;
   a friction member frictionally engaging the hub and normally rotating with the hub;
   a resilient member biased to maintain the friction member in engagement with the hub member;
   a movable coupling member meshingly coupled to the friction member and movable to selectively couple and uncouple the friction member to the housing; and
   means for moving the coupling member into coupling engagement with the housing, thereby limiting rotation of the coupling member and the friction member with respect to the housing.

2. The steering input device of claim 1, wherein:
   the resilient member comprises a cylindrical member mounted about the shaft and having a portion engaging the friction member.

3. The steering input device of claim 2, further comprising:
   a bearing member rotatably mounted on the shaft; and
   the resilient member having a radially inner part engaging the bearing member and an outer peripheral part engaging the friction member.

4. The steering input device of claim 1, wherein:
   the resilient member comprises an annular Belleville spring mounted about the shaft and having an outer portion engaging the friction member.

5. The steering input device of claim 1, further comprising:

a spring member biased to urge the coupling member out of engagement with the housing.

6. The steering input device of claim 1, wherein:

the coupling member is axially slidably coupled to the friction member and is coupled to the friction member for limited rotation with respect thereto.

7. The steering input device of claim 1, wherein:

the friction member has a hollow cylindrical body with an inner surface forming a plurality of tabs which project radially inwardly and which extend axially; and the coupling member has a hollow cylindrical body with an outer surface forming a plurality of axially extending slots which meshingly and slidably receive the tabs of the friction member.

8. The steering input device of claim 1, wherein:

the housing forms a plurality of projections which extend radially and which project axially towards the coupling member; and the coupling member has a hollow cylindrical body forming a plurality of recesses which extend radially and which open in an axial direction, the coupling member being movable axially to a locked position wherein the receses meshingly receive the projections and to an unlocked position wherein the receses are disengaged from the projections.

9. The steering input device of claim 8, wherein:

the housing forms an annular recess which opens towards the coupling member, the plurality of projections being arranged in an annular array around an outer edge of the annular recess; and the means for moving the coupling member comprises an electromagnet coil mounted in the annular recess.

10. The steering input device of claim 1, wherein:

the hub member has a hollow cylindrical body forming an inner frustoconical friction surface; and the friction member has a hollow cylindrical body forming an outer frustoconical friction surface which engages the inner frustoconical friction surface of the hub member.

11. The steering input device of claim 1, wherein:

the friction member, the resilient member and the coupling member are received by the hub member.

12. The steering input device of claim 1, wherein:

the input shaft extends through the friction member, the resilient member and the coupling member.

* * * * *